United States Patent [19]

Jachimowicz

[11] 4,146,302
[45] Mar. 27, 1979

[54] CONSTRUCTION OF CABLE MADE OF OPTICAL FIBRES

[75] Inventor: Ludwik Jachimowicz, Elizabeth, N.J.

[73] Assignee: General Cable Corporation, Greenwich, Conn.

[21] Appl. No.: 810,885

[22] Filed: Jun. 28, 1977

Related U.S. Application Data

[63] Continuation of Ser. No. 582,879, Jun. 2, 1975, abandoned.

[51] Int. Cl.² ............................................. G02B 5/14
[52] U.S. Cl. ...................... 350/96.23; 156/173; 174/69; 174/72 TR
[58] Field of Search .......... 350/96.23; 174/69, 72 TR; 156/173

[56] References Cited

U.S. PATENT DOCUMENTS

| | | | |
|---|---|---|---|
| 3,027,417 | 3/1962 | Turner, Jr. ........................... | 174/69 |
| 3,798,099 | 3/1974 | Marcatili ........................... | 350/96.23 |
| 3,883,218 | 5/1975 | Slaughter ........................... | 350/96.23 |
| 3,937,559 | 2/1976 | Ferrentino et al. ................ | 350/96.23 |
| 3,955,878 | 5/1976 | Nowak ............................... | 350/96.23 |

*Primary Examiner*—John K. Corbin
*Assistant Examiner*—Stewart Levy
*Attorney, Agent, or Firm*—Roy C. Hopgood; John M. Calimafde; Charles W. Neill

[57] ABSTRACT

This invention is a fibre optic communication cable in which the signals are transmitted by light. The glass fibres used for the cable are protected from breaking strain and from excessively sharp bends by supporting helically wound optic fibres on the inside of a tension element with provision by which the diameters of the helical convolutions can become smaller to increase the axial length component of the optic fibres when the a axial length of the tube is increased by forces that strain the tube. Several ways of maintaining the helically wrapped optic fibres supported from the tube so as to permit decrease in the diameter of the helix are described and illustrated.

17 Claims, 9 Drawing Figures

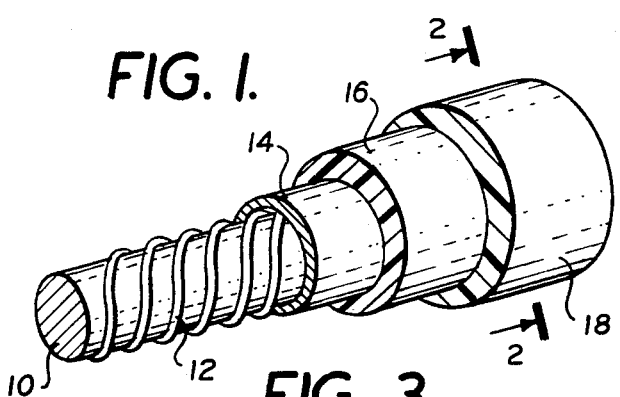
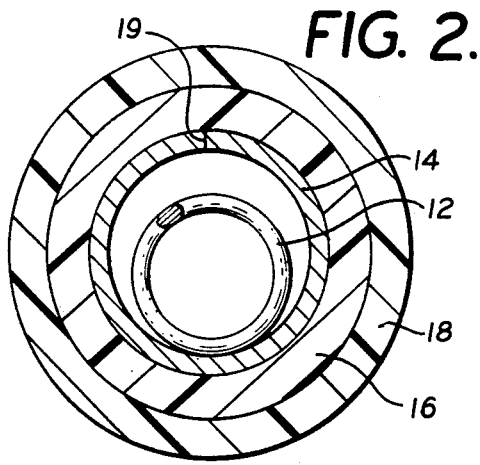
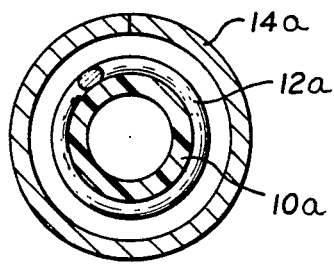
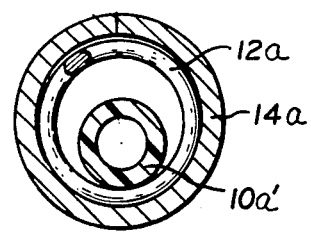
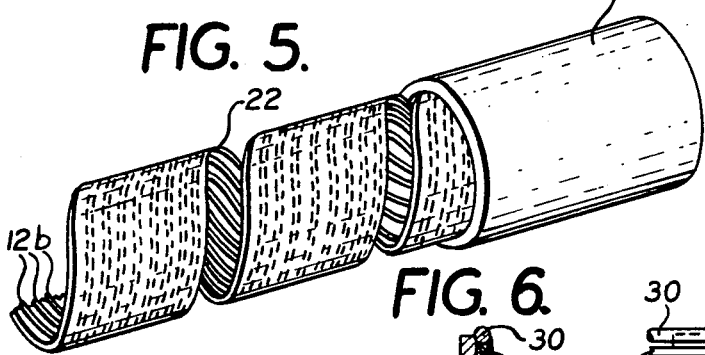
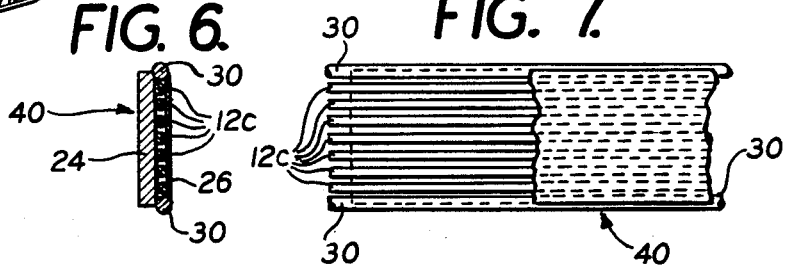
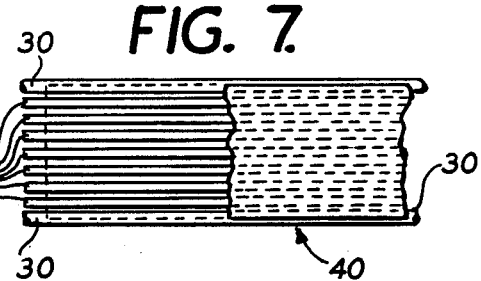
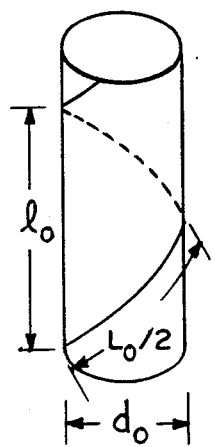
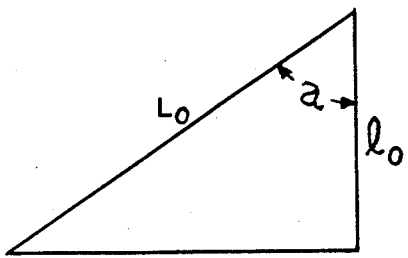
$$L_0{}^2 = (\pi d_0)^2 + \ell_0{}^2$$

CONSTRUCTION OF CABLE MADE OF OPTICAL FIBRES

RELATED APPLICATION

This application is a continuation of application Ser. No. 582,879, filed June 2, 1975 now abandoned for Construction of Cable Made of Optical Fibres.

BACKGROUND AND SUMMARY OF THE INVENTION

With the advent of the use of glass fiber filaments for transmission of signals by means of light pulses, the assembly of the fibre in a cable presented problems not encountered in the cable industry dealing with cabling of metallic strands.

The glass fibre has unique properties. The fibre is thin, in the order of 2-3 mils in diameter. It has high tensile strength of the order of 150,000-200,000 PSI, that is 1.5-2 lbs. per 3 mil diameter filament. However, there are spots in a kilometer length of a fibre, which will sustain only 10% of the ultimate strength, that is 0.2 lbs. The glass fibre is perfectly elastic up to about 1% elongation, after which the fibre snaps.

To preserve the glass fibre from snapping, when subject to tension, the fibre should not be subject to tension greater than 10% of the strength at break in consideration of this weak spot. At 10% of the ultimate strength there will be also 10% of ultimate elongation, that is 0.1%. Various schemes are proposed to combine a number of glass fibres, each individually coated with one or more layers of plastic, to protect the glass from abrasion, moisture and against excessive bending. The coated glass fibre has a diameter of 6-15 mils. One scheme of cable making follows the conventional cable making practice. It is to strand the fibres around a supporting member of steel or plastic. Another is to reinforce the optical fibres by cabling them with non-optical glass fibres for reinforcement, so that the fibre can withstand tension inherent in cable handling and installation.

The common shortcoming of all those schemes is lack of realization that any stress-supporting or reinforcing member, be it the coating of the glass fibre by plastics or a strength member placed inside or outside of the bundle of optical fibres, will not provide needed tensile force, until it is stressed, at which it will elongate. For instance, conventional electrical cables, at installation, or wrapped around cable drum, may elongate by 1-2-3% with the elongation retracting when pulling force is removed. However, glass fibre, as stated above, will snap already at 0.1% elongation of cable. This fact makes conventional cable making concepts unsuitable for making of cables out of optical glass fibres.

The subject of this invention, therefore, is a cable in which a strength carrying member may elongate by 2-3% while the glass fibre is not stressed and is not strained even the 0.1%, theoretically permissible. To achieve this effect a special construction is provided with helically wrapped optic fibres supported from a strength carrying member consisting of a tube, and with the fibres supported so as to permit decrease in the diameter of the helical convolutions when the strength carrying tube is elongated, and without tensioning the optic fibres to their elastic limit.

Other objects, features and advantages of the invention will appear or be pointed out as the specification proceeds.

BRIEF DESCRIPTION OF DRAWING

In the drawing, forming a part hereof, in which like reference characters indicate corresponding parts in all the views:

FIG. 1 is a diagrammatic view showing one way in which the optic fibres can be wound in a helix and inserted into a protective strength carrying tube to produce a fibre optic cable in accordance with this invention;

FIG. 2 is an enlarged sectional view taken on the line 2—2 of FIG. 1;

FIG. 3 is a sectional view illustrating the way in which the optic fibres can be wound in a helix on a hollow mandrel which is collapsible;

FIG. 4 is a view similar to FIG. 3 but showing the hollow mandrel collapsed and the fibre optic helix resting on the bottom of the load carrying tube;

FIG. 5 is a diagrammatic illustration showing another way in which the optic fibres can be formed into helixes and inserted into a load carrying tube;

FIG. 6 is a sectional view showing a construction similar to FIG. 5 but with a thin strip against the sides of the optic fibres which are remote from the heavier strip which holds the optic fibres in their helical relationship;

FIG. 7 is a view showing the inside of the sandwich construction shown in FIG. 6, with part of the front sheet broken away; and FIGS. 8 and 9 are geometric showings of certain correlations of helix angle and axial length which must be maintained in order to produce the results of this invention.

DESCRIPTION OF PREFERRED EMBODIMENT

FIG. 1 shows a mandrel about which an optic fibre 12 is wrapped in a helix. The optic fibre is then enclosed in a tube 14 which comprises the strength carrying member of the cable. One or more outer jackets 16 and 18 can be applied over the tube 14 which is preferably an aluminum tube with a welded seam 19; and the outer jackets 16 and 18 are preferably plastic jackets such as conventionally used on metallic conductor cables.

The tube 14 can be applied by longitudinally folding a metal strip around the helically wound optic fibres on the mandrel in accordance with the method of applying shielding to conventional electric cables and the method of applying the tube 14 need not be illustrated or described in order to provide a complete understanding of this invention.

After the tube 14 has been applied around the core consisting of the mandrel 10 and the optic fibre 12, the mandrel 10 is removed. The mandrel may be dissolved in acid, or melted by application of heat sufficient to cause the material of the mandrel to run out of the tube as a liquid, or may be dissolved in water and removed in solution with the water, depending upon the material of which the mandrel 10 is made. The preferred procedure should remove the mandrel without causing any axial movement of the mandrel within the fibre optic helix.

FIG. 2 shows the tube 14 with the fibre optic helix 12 resting on the bottom of the tube following removal of the mandrel 10. In this condition, any axial elongation of the tube 14 produces corresponding changes in the distance between successive convolutions of the helix and resulting reductions in the diameter of the convolutions so that the helix has greater axial length without subjecting the fibre optics to any tension. The reduction in helix diameter provides extra length of the axial component for the optic fibre of the helix.

In order to better understand this invention, consideration should be given to the effect if the mandrel 10 were used as the permanent support for the optic fibre 12 and as the strength carrying member of the cable. For purposes of illustration, assume that the optic fibre 12, with a plastic coating, is carried by a mandrel 10 having a core diameter of "$d_o$". The lay of the helix can be taken as "$l_o$" and the total length of the fibre in one convolution can be taken as "$L_o$". The following relation will then exist: $L_o^2 = l_o^2 + (\pi d_o)^2$.

When the cable becomes elongated so that $l_1 = a\, l_o (a > 1)$ then it will be evident if there is to be no elongation of the optic fibre; that is, there is to be no stretch and increase in the length "$L_o$" then the diameter of the core will have to be smaller.

A new equation for the length of the fibre can be written as follows: $L_o^2 = (al_o)^2 + (b_o d_o \pi)^2$, where "b" is less than 1.

The two equations for "$L_o^2$" being equal, the equations transform into;

$$\frac{b^2 - 1}{1 - a^2} = \tan^2 \alpha,$$

where $\alpha$ is the angle of helix with the cable axis.

If the coefficients "a" and "b" are deviating from unity by a small percentage, the equation can be simplified to $\Delta l/\Delta d$ equals $\tan^2 \alpha$.

Comparing different values for the angle $\alpha$ with the tangent of the angle we get the following relationship:

| $\alpha =$ | 80° | 75° | 60° | 54.74° | 45° | 30° | 20° | 10° |
|---|---|---|---|---|---|---|---|---|
| $\tan^2\alpha =$ | 32.2 | 13.9 | 3.0 | 2.0 | 1.0 | 0.33 | 0.13 | 0.03 |

For 1% decrease in the core diameter ($\Delta d = 1\%$), the available free length of filament in the direction of the cable axis will be 32.2% if the angle of helix is 80°. The smaller is the angle between the helix and the cable axis, the less surplus length $\Delta l$ will be available. At 54.74° angle per one percent of diameter decrease there will be 2% increase of fibre in the longitudinal direction of cable. This is exactly what is needed to maintain the structure in equilibrium. If the diameter of the core decreased by one percent, then it elongated two percent (assuming constant density of the core), since diameter and length of cylinder of constant volume change in square root proportion. The core elongated 2% and the filament elongated two percent.

At angles smaller than 54.74°, the reduction of core diameter will not free sufficient length of fibre to accommodate cable elongation. At 20° angle 1% decrease of core diameter, that is elongation of cable by 2%, the available $\Delta l$ will be only 0.13 against required 2%, hence the fibres will have to be stretched beyond available 0.13% and will snap.

From the above reasoning, it will be apparent that there are two serious objections to the use of a load carrying cylindrical rod about which the optic fibres are wrapped helically. One objection is the required filament length, and the other is the fibre bending radius.

If the limiting angle of 54.74° is adopted, at which there is no need to strain the optic fibre, the physical length of the optic fibre becomes prohibitive. It is 73% longer than the cable axis. This is unacceptable in cost and attenuation. For example, fibre having attenuation of 20 dB/KM, when assembled into a cable, because of increased length alone will have an attenuation of 34.6 dB.

The other consideration is radius of fibre bending. To prevent the light from escaping from the optic fibre, and causing increase in attenuation, the radius of fibre bending should not be less than about 3". The radius of curvature of the fibre in the helix can be shown to be equal to $R_o/\sin^2\alpha$, where $R_o$ is the radius of the cable core. The optic fibre cables are of small diameter, in the order of $\frac{1}{2}$". For the diameter of $\frac{1}{2}$", $R_o = 0.25$" and $\alpha = 54.74$". $R = 0.25/0.67 = 0.37$" which is an unacceptable small radius. The maximum angle of helix to accommodate 3" radius requirement is 16.8° for a 0.5" diameter core.

For an advantageous fibre optic cable construction, the physical length of the optic fibres should be about 3-5% longer than the cable length and have abou $2\frac{1}{2}\%$ of this length available for cable elongation, before any stress is developed in the optic fibres, with some small length of surplus left to accommodate the length increment resulting from bunching of the fibres on the smaller diameter when the cable is stretched. This invention provides the optic fibre 12 in a hollow tube 14 made of metal (or plastic), with the strength member provided by the hollow tube plus whatever armor is wrapped around the tube for reinforcement, such as the outer jackets 16 and 18. This armor can be made of metallic wires or of plastic filaments of substantial strength at low elongation.

Inside of the tube 14, the optic fibre 12 is placed in such a manner that when the cable (the tube and its surrounding strength members), elongates up to about 2%, no stress is imparted to the optic fibres or filaments 12. The length of the filaments 12, in the unstressed cable, is no more than 3-5% longer than the cable axis. To achieve this the filaments are placed helically, or in waves equivalent to helix, inside of the hollow tube 14 and adjacent to the wall of the tube where they are allowed to move, without significant impediment, toward the center of the tube (converse on the center line), as the cable is elongated.

The space within the cable tube 14 can be filled with air or gas, or in the case of submarine cables, with a liquid (oil, petrolatum) to equalize pressures within and outside the tube 14.

The mandrel 10 in FIG. 1 can be made of a low melting point alloy, such as Wood's metal. After the optic fibres 12 are helically wound on the mandrel and closed in the tube 14, the tube can be heated and the fused low melting alloy can be drained from the tube in an operation which is the reverse of the filling of a sodium cable, as in U.S. Pat. No. 3,389,460.

If, for example, the protective tube 14 has an inner diameter of 0.5", and 19 optic filaments, coated to a diameter of 0.015" each, and in which it was decided to have 2% elongation for the cable free of approaching stress point of the fibres, and the original length of the fibres were 3% longer then the cable axis, the parameters of the cable will be as follows:

(1) Before cable elongation:
   $d_o = 0.5" - 0.015 = 0.485"; l_o = 1.00; L_o = 1.03$ then
   $\cos \alpha = l/L_o = 0.97$  $\alpha = 13.86°$
   Radius of fibre bending $R = (0.485/2) \times (l/\sin^2\alpha) = 4.2"$
   Lay length $L_o = 6.18"$
(2) After cable is stretched 2%

$(l^2 - 1)/(1 - a^2) = \tan^2 \alpha$ for $b = 1.02$ (cable elongated 2%)

the $a = 0.66$ and $d_1 = 0.66\ d_o = 0.32''$, $R = 12.3''$, Lay length 6.3"

From the above it is apparent that the 19 fibres helically distributed around 0.485 diameter space, after removal of the mandrel, converge in the empty tube on a 0.032" diameter, sufficient to accommodate 19 fibres without interference from each other. The radius of the fibre bending becomes 12.3" which is much in excess of the minimum 3" for preventing loss of light through the sides of the fibres.

The disappearing mandrel 10 of FIG. 1 can also be made of ice, frozen petrolatum and the like, or other organic matter which has the property of being molten, volatilized or drained after the fibre optic helix has been wrapped around it and the mandrel heated. FIG. 3 shows a modified construction in which the optic fibres 12a is wrapped around a collapsible mandrel 10a which is made of rubber or other elastomer and inflated with gas under pressure. After the protective tube 14a has been placed around the optic fiber helix, the pressure within the tube is withdrawn and the tube collapses to a smaller size as indicated by the reference character 10a' in FIG. 4. This leaves the fibre optic helix 12a free to decrease in diameter and move closer to the center of the tube when the tube 14a is elongated by tension forces applied to the tube.

FIG. 5 shows another modified construction in which the optic fibres 12b are placed in parallel spaced relation on a strip 22. The strip 22 is formed into a helix, preferably with space between successive convolutions, as shown in FIG. 5. The optic fibres 12 are preferably on the inside surface of the strip 18 and secured to the strip by adhesive. The helically wound optic fibres 12b are thus supported from outside the helix by the strip 22 which may be made of flexible paper, plastic or other strip material stiff enough to be used as shown in FIG. 5.

FIGS. 6 and 7 show the preferred construction in which the optic fibres 12c are connected to a strip 24 which may be made of paper, plastic, or other thin flexible material including metal. This strip is preferably somewhat resilient so that it tends to restore the original diameter of the helix when tension forces on the cable cease. Optic fibres or filaments 12c are shown equally spaced across the strip 24 but this is not an essential feature. An inner strip 26 covers the filaments 12c and forms with the strip 24 a sandwich that encloses the optic fibres and protects them from the surrounding environment at all times including the time of assembly of the strip and optic fibres with the tube 14.

In order to give more resilience to the sandwich construction shown in FIGS. 6 and 7, wires 30 are secured to the strip 24 along the opposite edges of the strip. Copper wires are suitable if they are sufficiently resilient to provide a spring effect for the strip 24 to return to its original helix diameter when the tension forces on the cable are relaxed. If the strip 24 is made of metal or other material of sufficient resilience then the wires 30 are not necessary.

The construction shown in FIGS. 5, 6 and 7 can be made at any time and wound into a spiral roll which can be transformed into a helix at the time that the construction is assembled to make the cable.

Strip 22 or 24 is inserted into the protective tube 14b with the strip forming a helix having a diameter substantially equal to the inside diameter of the tube. The helix decreases in diameter as the tube elongates as the result of tension strains in the tube; and preferably comes back to its original diameter when the strain is relaxed and the tube contracts to its original length. Decrease in the diameter of the helix convolutions increase the lay of the helix and increases the axial component of the direction of extent of the optical fibres.

The sandwich strip of FIGS. 6 and 7 may be fed through a suitable die, helically into the protective tube 14, shown in the other Figures, as the tube is formed by either extrusion or by folding it around the helically wound filaments as already described. The stiffness and resilience of the strip 24 causes the sandwich to rest (press) on the inner wall of the tube. When the fibre optic cable is wound on a reel, the helically deposited sandwich strip of FIGS. 6 and 7 will slide, as in conventional cable construction, compensating for bending movements of the cable.

When the cable is elongated, however, there is a reduction in the diameter of the helical convolutions; but this does not decrease the radius of curvature because of the increase in the lay of the helix. This is important because in addition to maintaining a minimum radius of curvature for the optic fibres to prevent light from escaping from the interior of the fibres, it is also necessary to maintain a minimum radius of curvature in order to prevent the optic fibres from breaking. The original diameter of each convolution of the fibre optic helix should be sufficient to keep the stress in the optic fibre below 10 grams per circular mil. In the preferred construction the stress resulting from the radius of curvature of the helical convolutions is kept to a limit of 2.5 grams per circular mil by using a 3" radius of helix curvature. This is given by way of illustration. It should be noted that the radius of curvature of the optic fibres increases as the lay of the optic fibre helix increases.

Another consideration in the construction shown in 5, 6 and 7 is that excessive torsion of the optic fibres must be prevented since this causes a shearing stress to develop in the fibres.

If the fibres are fed into the protective tube with planetary motions of individual fibres, then there will be no torsion twist of fibres and no torsion stresses. Only mild stresses, caused by bending of fibres into a helical path will be present. However, the adhering of fibres in parallel rows on backing strips as shown in FIGS. 5, 6 and 7 presents a torsion problem.

Manufacturing the cable by using a rigid frame configuration for the sandwich or strip that carries the optic fibres presents a tempting simplicity. In the first operation, optic fibres arranged parallel to each other can be fed on to an adhesive tape. Another tape can be gently placed on top of the fibres if the construction is to be a sandwich construction. The strip or sandwich, so formed, is wound into a spiral ("pancake") coil. This coil is subsequently formed into a helix which is fed into a tube as the tube is extruded or folded around the helix.

The drawback to this method is that the torsion stresses in the fibres as the strip which carries the fibres is formed into a helix becomes excessive. A solution to the problem is to pretwist individual optic fibres to approximately one half of the allowable torsion stress by a left hand twist, and then make the helix with an opposite (right hand) twist so as to cancel the stress induced by the original left hand twist and with the amount of twist substantially cancelling the original twist.

FIG. 8 is a diagram showing the diameter lay and axial length of one convolution of the fibre optic helix; and FIG. 9 is a development of the surface shown in FIG. 8.

The preferred embodiments of the invention have been illustrated and described. The dimensions have been grossly exaggerated for clearer illustration. Additional modifications can be made and some features can be used in different combinations without departing from the invention as defined in the claims.

What is claimed is:

1. An optic fibre communication cable comprising a hollow protective tube, optic fibres within the tube and extending lengthwise of the tube along substantially helical paths of substantially equal diameter and longitudinally spaced from one another and adjacent to the inside wall of the tube, the optic fibres being held on one side of a stiffly flexible strip of material that is wrapped into an open helix within the tube, said tube enclosing a space immediately inward of the optic fibres around substantially the entire diameter of the helical paths so as to leave an open space into which the fibres move as the cable increases in length under tension loading and the helical convolutions of the strip decrease in diameter with resulting decrease in the diameter of the helical paths of the fibres, the optic fibres being under negligible stress in the tube and the decrease in the diameter of the helical strip preventing stressing of the optic fibres when the protective tube of the cable is elongated by the tension loading, said strip having sufficient resilience to spring back to its original convolution diameter when the tension loading on the tube are relieved.

2. The fibre optic communication cable described in claim 1 characterized by the length of the optic fibres being greater than the length of the protecting tube by an amount greater than the elongation to which the cable will be subjected by tension forces when in the service for which the cable is intended to be used, the optic fibres being in positions parallel to one another if the strip is rolled out flat.

3. The fibre optic communication cable described in claim 1 characterized by the length of the optic fibres being not more than about 5% greater than the length of the axis of the tube.

4. The fibre optic communication cable described in claim 1 characterized by the protective tube having tensile strength that limits its elongation under its intended service conditions to a predetermined percentage increment, and the optic fibres along the helical path exceeding the length of the axis of the tube by a percentage greater than said elongation of the tube whereby the optic fibre is never subjected to the tension on the tube under the conditions for which the cable is intended to be used.

5. The fibre optic communication cable described in claim 4 characterized by the cable having an elongation up to 2% under the intended service conditions, and the optic fibres being from 3 to 5% longer than the unstressed cable.

6. The fibre optic communication cable described in claim 1 characterized by the optic fibres being supported from the inside wall of the tube and being under negligible stress in the unstressed tube and having a maximum fibre elongation of about 0.05% elongation when the cable is stressed to the full extent encountered by the maximum tension strength on the tube under its intended service conditions.

7. The fibre optic communication cable described in claim 1 characterized by the tube containing within the fibre optic helix a structure on which the helix was wound during manufacture of the cable, said structure being collapsed to a degree that leaves the optic fibres free to move under a force that causes a 0.05% elongation stress of the optic fibre to a reduced helix diameter.

8. The fibre optic communication cable described in claim 7 characterized by said structure being a collapsible tube of elastomer material capable of stretching to provide a mandrel for the original winding of the fibre optic helix of the desired diameter.

9. The fibre optic communication cable described in claim 1 characterized by the tension-supporting structure of the cable being located entirely outside of the fibre optic helix and including the tube and other tension resisting structure adjacent to said tube and some of which is outside of the tube as armoring structure for the tube.

10. The fibre optic communication cable described in claim 1 characterized by the radius of curvature of the optic fibres, at any location along the helix, being not less than 2.5".

11. The fibre optic communication cable described in claim 1 characterized by the cable, when unstressed, having negligible tension in the optic fibres, and the helix leaving the optic fibres free of any stress caused by tension strain in the tube and any surrounding armor on the cable until the tube and any armor have been strained by an amount of 1–4% depending upon the service in which the cable is intended to be used.

12. The fibre optic communication cable described in claim 1 characterized by a collapsible mandrel in the cable and surrounded by the helix of optic fibres and on which the optic fibres were originally wound during manufacture of the cable, said mandrel being in collapsed condition with a reduced cross section, and small enough to leave space for the necessary reduction in the diameter of the helix to avoid tension in the optic fibres when the cable is strained.

13. The fibre optic communication cable described in claim 1 characterized by the flexible strip being a material that is substantially unstretchable at forces that will pull the helix to a longer lay and reduced diameter, and the optic fibres being secured to the strip along substantially parallel courses spread from one another across the width of the strip.

14. The fibre optic communication cable described in claim 1 characterized by the optic fibres being sandwiched between two confronting strips of material, one of which is said stiffly flexible strip, and the other of which is a thinner strip that covers the optic fibres on the side facing away from the inside surface of the tube.

15. The fibre optic communication cable described in claim 1 characterized by a plurality of optic fibres being carried on one of the wide surfaces of a strip of resilient material formed into a helix and connected with the protective tube at spaced locations along the length of the tube so that elongation of the tube elongates the helix and causes the helix convolutions to decrease in diameter.

16. The fibre optic communication cable described in claim 1 characterized by the strip having wires secured to it along opposite edges thereof, said wires providing a substantial part of the resilience that causes the strip to spring back to its original convolution diameter when the tensioning forces on the tube are relieved.

17. The method of making a fibre optic communication cable which comprises wrapping optic fibres around a mandrel, removing the mandrel and leaving the optic fibres along a helical path, placing a protecting tube and tension resisting element around the outside of the helical path and close to the optic fibres, and leaving empty space within the tube immediately inward of the optic fibres around substantially the entire inside diameter of the helical paths so as to leave an air-filled space into which the helical convolutions can move to decrease the diameter of the convolutions if the cable is elongated by tension force on said tube.

* * * * *